United States Patent
Walters et al.

(10) Patent No.: US 11,560,788 B2
(45) Date of Patent: Jan. 24, 2023

(54) SYSTEM AND METHOD FOR ESTIMATION AND PREDICTION OF PRODUCTION RATE OF A WELL VIA GEOMETRIC MAPPING OF A PERFORATION ZONE USING A THREE-DIMENSIONAL ACOUSTIC ARRAY

(71) Applicant: HALLIBURTON ENERGY SERVICES, INC., Houston, TX (US)

(72) Inventors: Darren Philip Walters, Tomball, TX (US); Freeman Hill, Spring, TX (US); Yinghui Lu, The Woodlands, TX (US); Avinash Vinayak Taware, San Jose, CA (US); Srinivasan Jagannathan, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 333 days.

(21) Appl. No.: 16/332,759

(22) PCT Filed: Oct. 11, 2016

(86) PCT No.: PCT/US2016/056445
§ 371 (c)(1),
(2) Date: Mar. 12, 2019

(87) PCT Pub. No.: WO2018/071002
PCT Pub. Date: Apr. 19, 2018

(65) Prior Publication Data
US 2019/0218906 A1 Jul. 18, 2019

(51) Int. Cl.
*E21B 47/107* (2012.01)
*E21B 47/12* (2012.01)
(Continued)

(52) U.S. Cl.
CPC ............ *E21B 47/107* (2020.05); *E21B 43/25* (2013.01); *E21B 47/09* (2013.01); *E21B 47/12* (2013.01);
(Continued)

(58) Field of Classification Search
CPC ........ E21B 47/00; E21B 47/09; E21B 47/107; E21B 47/12; E21B 43/25; G01V 99/005;
(Continued)

(56) References Cited

U.S. PATENT DOCUMENTS

| 4,397,353 A | * | 8/1983 | Lacy | E21B 33/138 166/269 |
| 6,745,156 B2 | * | 6/2004 | Cook | G16H 50/70 702/189 |

(Continued)

FOREIGN PATENT DOCUMENTS

| CN | 102608036 A | * | 7/2012 | |
| WO | WO-2015178931 A1 | * | 11/2015 | ......... E21B 41/0092 |

(Continued)

OTHER PUBLICATIONS

S. J. Bourne and etal, "Predictive Modelling of Naturally Fractured Reservoirs Using Geomechanics and Flow Simulation", GeoArabia (2001) 6 (1): 27-42 (Year: 2001).*

E. Sarradj, "Three-Dimensional Acoustic Source Mapping with Different Beamforming Steering Vector Formulations", Advances in Acoustics and Vibration vol. 2012, Article ID 292695, 12 pages doi:10.1155/2012/292695 (Year: 2012).*

(Continued)

*Primary Examiner* — Douglas Kay
(74) *Attorney, Agent, or Firm* — Novak Druce Carroll LLP

(57) ABSTRACT

Acoustic characterization and mapping of flow from a perforation zone of a well. As a wireline probe containing acoustic sensors moves through the well, the acoustic sen-
(Continued)

sors record acoustic pressure measurements of flow for each perforation in the well casing. The acoustic data is recorded and compiled into a three-dimensional flow model showing flow of hydrocarbons within and/or out of perforation tunnels. The three-dimensional flow models generated can be combined with historical data to form four-dimensional models illustrating flow over time, and both the three and four-dimensional models can be used to determine effectiveness of perforation charges as well as future flow from the well.

18 Claims, 5 Drawing Sheets

(51) Int. Cl.
| | |
|---|---|
| G01V 1/50 | (2006.01) |
| G01V 1/28 | (2006.01) |
| E21B 47/09 | (2012.01) |
| G01V 1/40 | (2006.01) |
| E21B 43/25 | (2006.01) |
| G01V 99/00 | (2009.01) |
| G06Q 10/04 | (2012.01) |

(52) U.S. Cl.
CPC ............... *G01V 1/282* (2013.01); *G01V 1/40* (2013.01); *G01V 1/50* (2013.01); *G01V 99/005* (2013.01); *G06Q 10/04* (2013.01); *G01V 2210/66* (2013.01)

(58) Field of Classification Search
CPC ............. G01V 1/40; G01V 1/48; G01V 1/50; G01V 1/282; G01V 2210/66; G06Q 10/04
See application file for complete search history.

(56) References Cited

U.S. PATENT DOCUMENTS

| | | | | |
|---|---|---|---|---|
| 10,001,769 | B2 * | 6/2018 | Huang | E21B 43/267 |
| 10,853,533 | B2 * | 12/2020 | Plateaux | G06F 30/20 |
| 2008/0307877 | A1 * | 12/2008 | Cook | E21B 43/11 |
| | | | | 73/152.57 |
| 2009/0218097 | A1 * | 9/2009 | Cook | E21B 47/002 |
| | | | | 166/250.17 |
| 2012/0176862 | A1 | 7/2012 | D'Angelo et al. | |
| 2012/0191432 | A1 * | 7/2012 | Khataniar | E21B 43/14 |
| | | | | 703/10 |
| 2013/0154846 | A1 | 6/2013 | Mangione et al. | |
| 2014/0121972 | A1 | 5/2014 | Wessling et al. | |
| 2015/0177403 | A1 * | 6/2015 | Haugen | E21B 47/001 |
| | | | | 73/152.47 |
| 2015/0268377 | A1 * | 9/2015 | Wortche | E21B 47/003 |
| | | | | 702/6 |
| 2016/0024911 | A1 * | 1/2016 | Bell | E21B 43/117 |
| | | | | 702/12 |
| 2017/0030174 | A1 * | 2/2017 | Van Dongen | E21B 43/162 |
| 2017/0045634 | A1 * | 2/2017 | Collins | G01V 1/284 |

FOREIGN PATENT DOCUMENTS

| | | | |
|---|---|---|---|
| WO | 2016010553 A1 | 1/2016 | |
| WO | WO-2016115030 A1 * | 7/2016 | ............ E21B 47/113 |
| WO | 2017062015 A1 | 4/2017 | |

OTHER PUBLICATIONS

International Search Report and Written Opinion; PCT/US2016/056445; dated Jul. 11, 2017.

* cited by examiner

SYSTEM AND METHOD FOR ESTIMATION AND PREDICTION OF PRODUCTION RATE OF A WELL VIA GEOMETRIC MAPPING OF A PERFORATION ZONE USING A THREE-DIMENSIONAL ACOUSTIC ARRAY

CROSS-REFERENCE TO RELATED APPLICATIONS

This application is a national stage entry of PCT/US2016/056445 filed Oct. 11, 2016, said application is expressly incorporated herein in its entirety.

BACKGROUND

Technical Field

The present disclosure relates to oil and gas production and more specifically to modeling oil and gas production of a well using acoustic sensors.

Background

During the life cycle of an oil/gas well, returns on investment naturally decline over time, requiring intervention work to prolong the effective life of the well. An example of such intervention work is setting off perforation charges within a well. The perforation charges explode through the well casing and into the rock formation to initiate fractures, and thereby allow hydrocarbons to flow into the well. Well operators, prior to setting off the charges, have expectations regarding what the production will be following the perforating event. Those expectations are defined based on past experience and simulations performed in laboratories.

DETAILED DESCRIPTION

Figure 1:
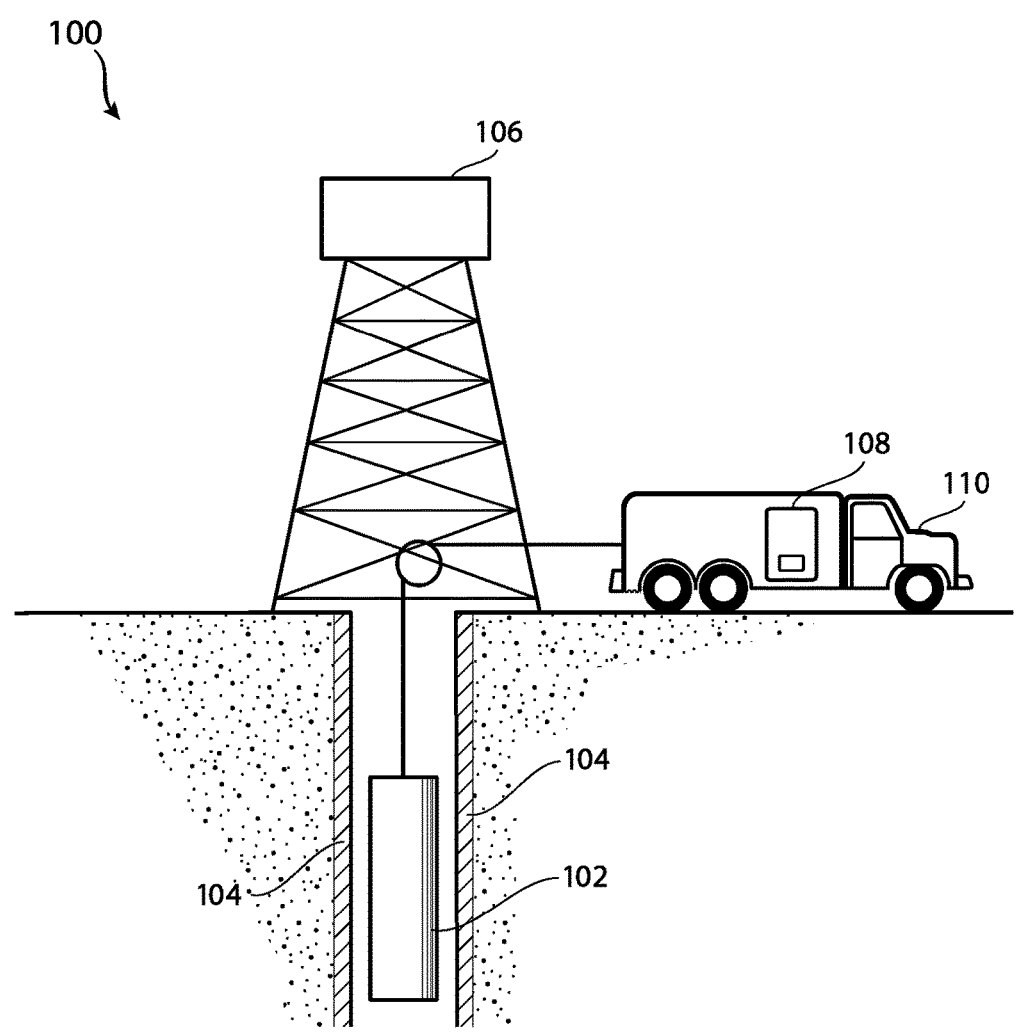
FIG. 1 illustrates an example wireline embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

A system, method and computer-readable media are disclosed for acoustic characterization and mapping of production from a perforation zone of a well. In general terms, the disclosed systems and methods model the actual production flow associated with downhole perforations based on acoustic measurements taken by a downhole probe moving through the well. The three-dimensional (3-D) model can be compared to and combined with previous data to generate a four-dimensional (4-D) model representing the production flow over time.

The information gathered, and the models generated, can be used to track production flow, to assess whether the perforation charges created perforations as expected, to monitor reduction in flow due to scale, and to predict variations in production flow over a variable time horizon (specifically considering changes in flow due to perforations). In addition, the models generated and the data gathered can be used to estimate the phase distribution (oil, water, or gas), aiding in the quality assessment of the perforation zone. As described herein, computer systems can be improved using the data collected, the models generated, and the flow analyses performed. For example, modeling systems can rely on the data to become more accurate, and can provide improved guidance on how to effectively prolong the life of the well. Such guidance can take the form of identifying types and number of charges to use for a given formation, the angle at which such charges should be placed, and what additional measures will be required to maintain the flow at desired rates.

Various embodiments of the disclosure are described in detail below. While specific implementations are described, it should be understood that this is done for illustration purposes only. Other components and configurations may be used without parting from the spirit and scope of the disclosure. These variations shall be described herein as the various embodiments are set forth. The disclosure now turns to FIG. 1.

FIG. 1 illustrates an illustrative wireline logging system 100, where a wireline probe 102 is probing a well/borehole having a casing 104. The wireline probe 102 is connected by a wireline cable to a well-logging truck 110 located at the rig site 106. The wireline cable provides power to the wireline probe 102 and is used to transmit measurements taken from the wireline probe 102 to the well-logging truck 110. The well logging truck 110 contains a computer 108 that receives the measurements, preferably stores the measurements, and utilizes the measurements for analyses of the well, the formation surrounding the well, flow rates, etc.

Figure 2:
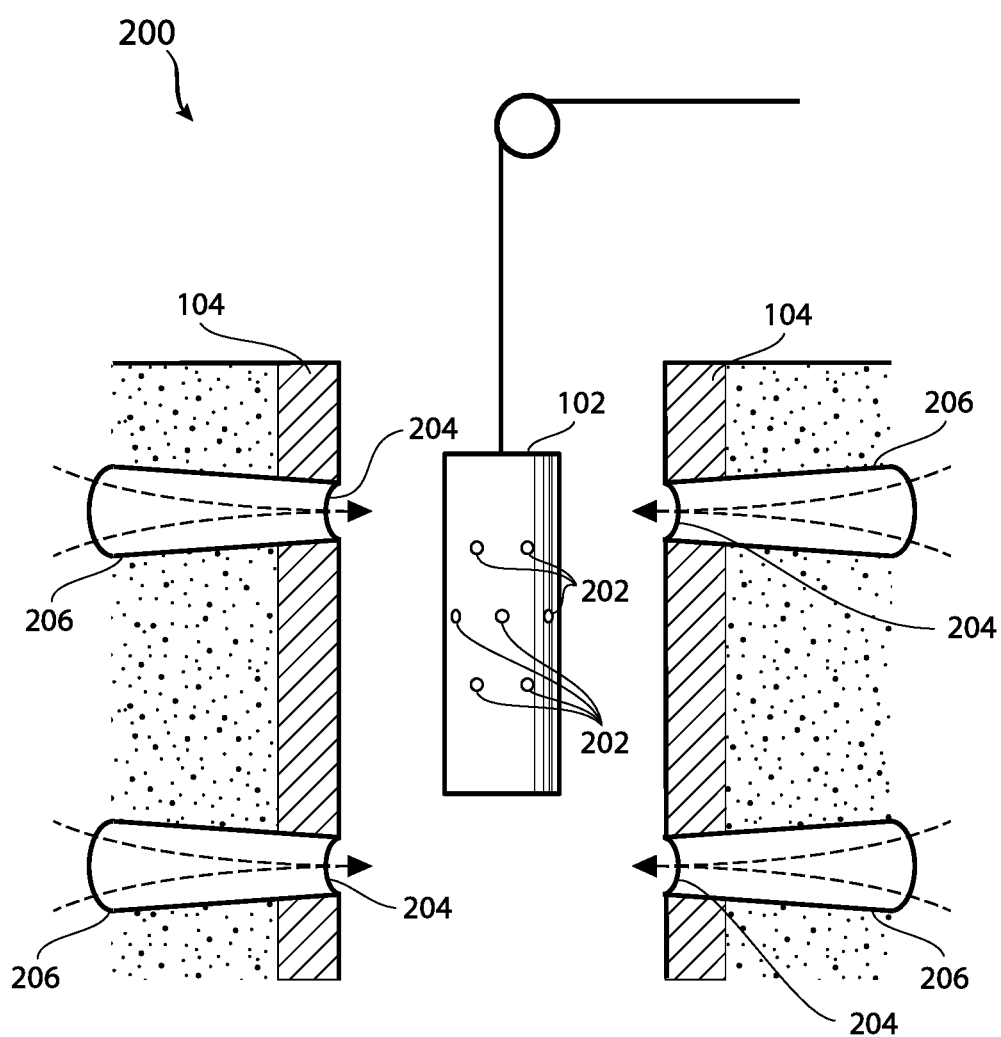
FIG. 2 illustrates acoustic sensors recording downhole perforation data.

FIG. 2 illustrates a wireline logging system 200, where the wireline probe 102 contains an array of acoustic sensors 202. Acoustic sensors 202 are sensors designed to detect changes in pressure. In a downhole environment, the acoustic sensors 202 must also be waterproof, and such waterproof acoustic sensors can be referred to as hydrophones. The sensors 202 record acoustic (pressure) data associated with perforations 204 in a well casing 104 as the wireline probe 102 is moved through the well. More specifically, the acoustic sensors 202 are positioned on the wireline probe 102 to detect depth and radial localization of acoustics generated by flow from perforations at a given level (z-axis). Processors within the tool (wireline probe 102) or at the surface can then map the azimuthal makeup of the acoustics generated flow from a perforated zone at a given depth. The map can reveal the tunnels 206 formed into the formation by the perforation charges, and from that information the effectiveness of various perforation charges for specific formations and conditions can be evaluated.

For example, if an operator has recently set off a group of perforation charges within a well, resulting in a number of perforations 204 within the well casing 104. Each of the perforation charges not only create a perforation, or opening, within the well casing 104 through which oil/gas/other hydrocarbons can flow, the charges also create tunnels 206 into the rock formation on the other side of the well casing 104. Oil and gas flow into these tunnels 206, out of the resulting perforation 204, and into the well for extraction. However, the operator wishes to know (1) how effective the perforation charges were in producing the tunnels desired and (2) how long the tunnels will be viable (physically or commercially) before additional action needs to be taken.

The operator then uses the wireline probe 102 with the acoustic sensors 202 to obtain data necessary to answer these problems. The wireline probe 102 is moved through the well at a known rate, logging information/data about the flow from the various perforations. The known rate can be constant or can vary throughout the well or well section. The acoustic sensors 202 should be arranged to capture a three-dimensional picture of flow associated with each perforation. For example, the sensors 202 can be uniformly arranged around the wireline probe 102 (such as being equilaterally distributed about the probe), or can be non-uniformly arranged around the wireline probe 102. The sensors are arranged in a 3-D profile, forming a 3-D sensor network. As the wireline-probe 102 is moved throughout the well, each sensor detects and records data regarding the pressure of flow. This data can be timestamped and correlated with the depth/location within the well, as well as the orientation of the probe and orientation of the sensor within the well. The data can also include the angles and amount of pressure (i.e. speed) of the flow being detected.

Figure 3:
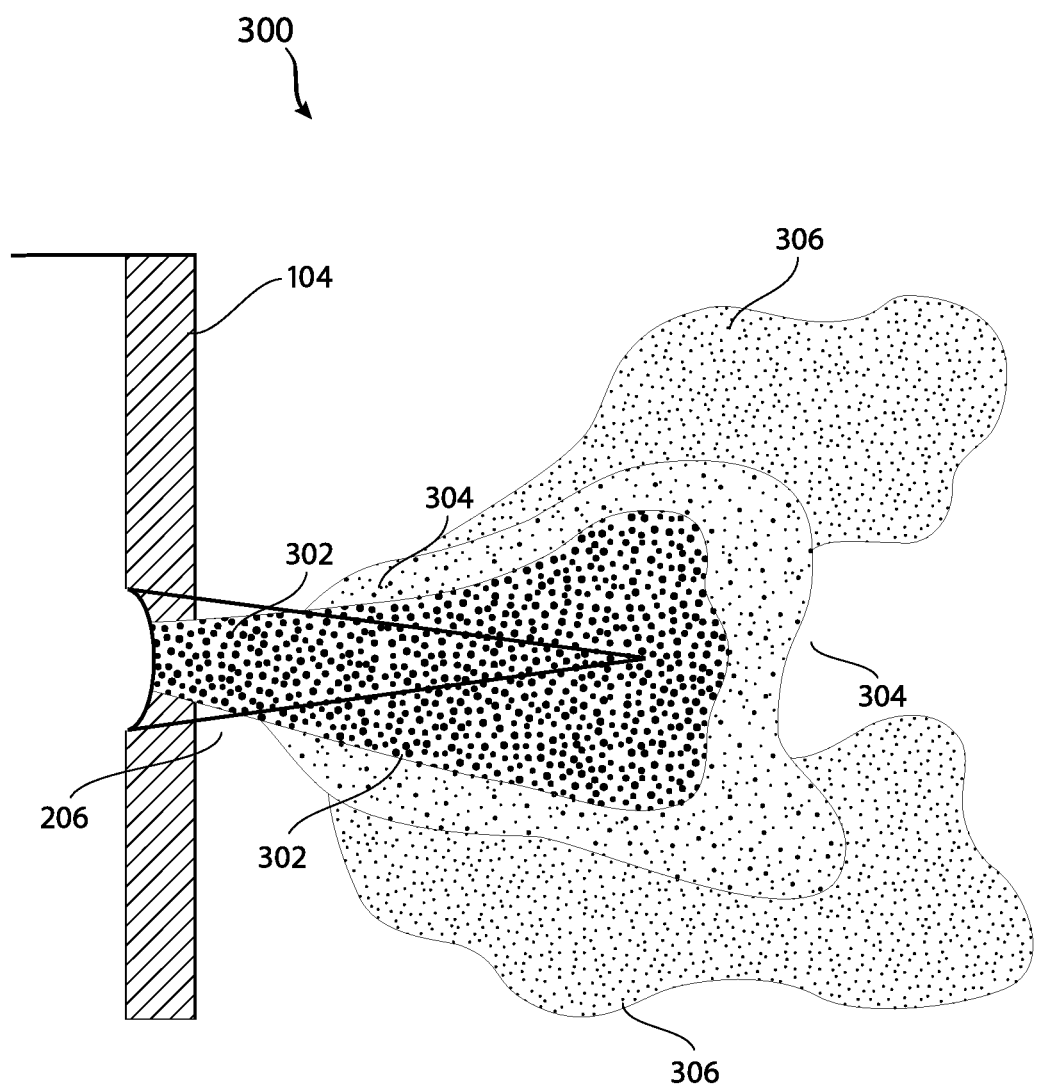
FIG. 3 illustrates an exemplary two-dimensional flow map of a perforation zone.

FIG. 3 illustrates an exemplary two-dimensional flow map 300 of a perforation zone. This perforation zone is associated with a hole/perforation within the well casing 104 and the tunnel 206 into the formation. While logging the perforation zones, the tool and its data interpretation algorithms can detect the tunneling that contributes to the flow of hydrocarbons (that is, the effective tunneling) and also assess the structural impact from such an event.

The tool can generate a 3-D map of production flow from the data recorded. The 3-D map can look similar to the 2-D map illustrated in FIG. 2, albeit in three dimensions. Specifically, the generated map can illustrate the hole, the resulting tunnel 206, and zones reflecting the rate of flow. As illustrated, zone 302 has a high rate of flow, zone 304 has a medium rate of flow, and zones 306 has a slow rate of flow. The illustrated breakdown of the flow into zones is exemplary. In actual practice, there can be more or less zones, can use linear/nonlinear rates (such as logarithmic scales), and/or the generated flow map can be organized using a continuous ranking system.

The production flow map can help to assess how the perforating charges used have performed in rock structure within that zone and whether the charges resulted in the expected perforation profile (radial depth and azimuthal orientation) to generate the expected 3-D flow. As a result, the 3-D model provide operators a clear view on what charges work best in respective formations to allow future wells in the same reservoir geology an improved return on investment.

By recording the 3-D models over time, a database of models and data can be constructed for specific wells and specific perforation zones within a well. Likewise, comparisons can be made based on formation type, depth, type of hydrocarbon being extracted, and/or the composition of the hydrocarbons being extracted. The historical data can be combined to show timelines of events that cause losses in production. Capturing this time tracked perforation flow data can allow a proactive approach to well intervention for operators, because operators will know how much time is available before the well (or specific perforation zones) have until a full scale build-up of sediment occurs.

The system can have a threshold detection implementation, where operators are informed of upcoming interventions required or suggested based on thresholds being met. For example, the system can notify an operator that a perforation will reach 50% occlusion within three months, or that a distinct type of perforation charge on the next interference action will result in improved long-term flow. This can help the operators have a preemptive program in place so as to take corrective action, thereby reducing the time the well would be shut, saving both time and money.

The 3-D model can be combined with historical data collected to allow prediction of the near future production flow. A machine learning approach or conventional predictive modeling methodology (such as predictive modeling, predictive algorithms, regression analysis, etc.) can be applied to historical flow map data to predict the expected flow map over a future time horizon so that well intervention can be planned for in case the flow is predicted to deteriorate significantly in the predicted time horizon.

By actively mapping (and thus monitoring) the amount of flow from the perforations while actively detecting and predicting when a sanding out or watering out of a formation has occurred (or is likely to occur), the operators can produce hydrocarbons at the maximum safe flow rate. This results in prolonging the life of the well and increase in production. For current wells with production problems the system can show what areas of the perforation are not producing at optimal performance and guide intervention engineers to a solution/remedy that is effective.

The 3-D flow map can be generated by using radial and azimuthal acoustics map sensed at a given depth, then stacking such 2-D maps (such as that illustrated in FIG. 3) along the depth as the tool is moved up or down in the production casing/liner. The tool can have the capability to generate a 3-D flow map using 3-D beamforming of sensed acoustics caused by perforation flow. This can be then stacked along the depth to generate a 3-D flow map. A 3-D time lapse study of perforation flow can also be generated with the tool parked at a depth in the perforation zone. By leaving the tool parked at a depth for a period of time, the resulting data can be used to generate a 4-D flow map for that segment of perforation zone. In effect, the 3-D flow maps generated over different log runs of the tool in a well's perforation zone can be combined to generate a time lapse or 4-D tracking of perforation flow. While this example (leaving the tool parked) allows for generation of a 4-D flow map for a specific perforation zone, the historical data associated with a well or with specific perforation zones within the well can be combined (with or without a current 3-D model) to generate a 4-D model of the perforation zone/well over time.

Along with 3-D/4-D quantitative flow profile of perforation zone, the interpretation algorithms can be used to estimate the phase distribution. This can help to assess absolute and relative productivity of different perforations zones in a given oil/gas well. For example, perforation zones with relatively higher water production can be demoted in favor of ones with lower water production.

Figure 4:
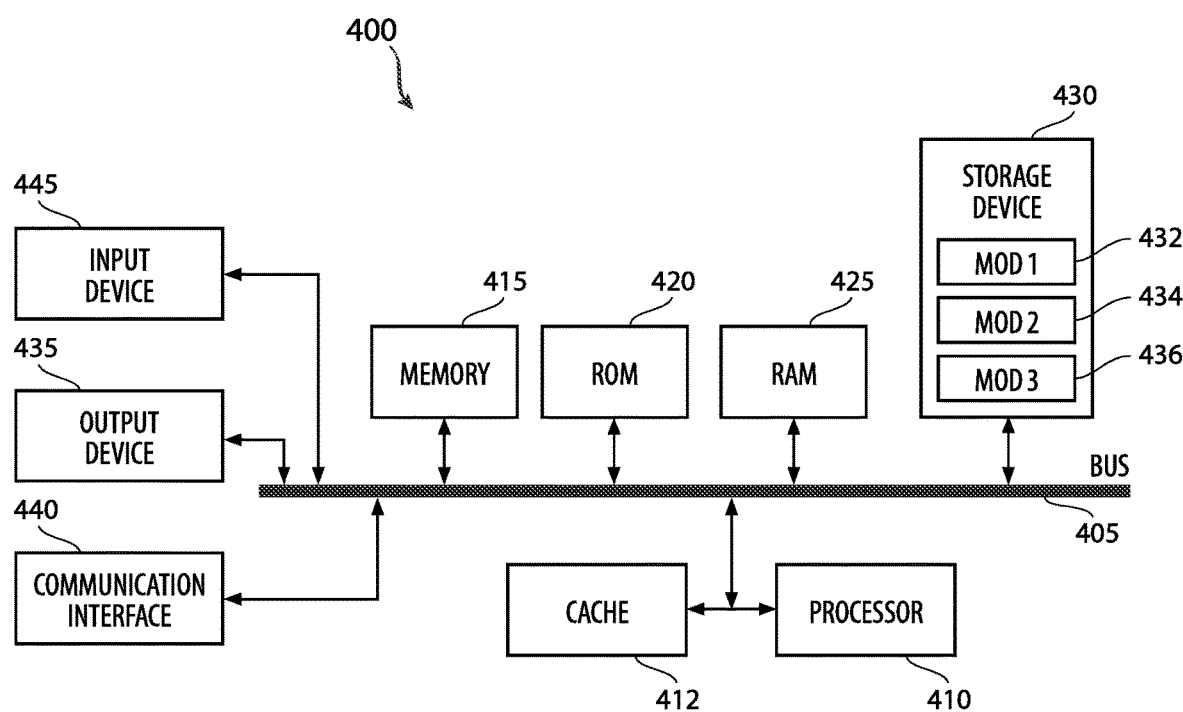
FIG. 4 illustrates an example system embodiment.

FIG. 4 illustrates an exemplary general-purpose computing device 400, including a processing unit (CPU or processor) 410 and a system bus 405 that couples various system components including the system memory 415 such as read only memory (ROM) 420 and random access memory (RAM) 425 to the processor 120. The system 400 can include a cache 412 of high speed memory connected directly with, in close proximity to, or integrated as part of the processor 410. The system 400 copies data from the memory 415 and/or the storage device 430 to the cache 412 for quick access by the processor 410. In this way, the cache provides a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. It can be appreciated that the disclosure may operate on a computing device 400 with more than one processor 410 or on a group or cluster of computing devices networked together to provide greater processing capability. The processor 410 can include any general purpose processor and a hardware module or software module, such as module 1 432, module 2 434, and module 3 436 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 420 or the like, may provide the basic routine that helps to transfer information between elements within the computing device 400, such as during start-up. The computing device 400 can further include storage devices 430 such as a hard disk drive, a magnetic disk drive, an optical disk drive, tape drive or the like. The storage device 430 can include software modules 432, 434, 436 for controlling the processor 410. Other hardware or software modules are contemplated. The storage device 430 is connected to the system bus 405 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 410, bus 405, display 435, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk, other types of computer-readable media which can store data that are accessible by a computer, such as magnetic cassettes, flash memory cards, digital versatile disks, cartridges, random access memories (RAMs) 425, and read only memory (ROM) 420, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 445 represents any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems enable a user to provide multiple types of input to communicate with the computing device 400. The communications interface 440 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 410. The functions these blocks represent may be provided through the use of either shared or dedicated hardware, including, but not limited to, hardware capable of executing software and hardware, such as a processor 410, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 420 for storing software performing the operations described below, and random access memory (RAM) 425 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 400 shown in FIG. 4 can practice all or part of the recited methods, can be a part of the recited systems, and/or can operate according to instructions in the recited tangible computer-readable storage media. Such logical operations can be implemented as modules configured to control the processor 410 to perform particular functions according to the programming of the module. For example, FIG. 4 illustrates three modules Mod1 432, Mod2 434 and Mod3 436 which are modules configured to control the processor 410. These modules may be stored on the storage device 430 and loaded into RAM 425 or memory 415 at runtime or may be stored in other computer-readable memory locations.

Figure 5:
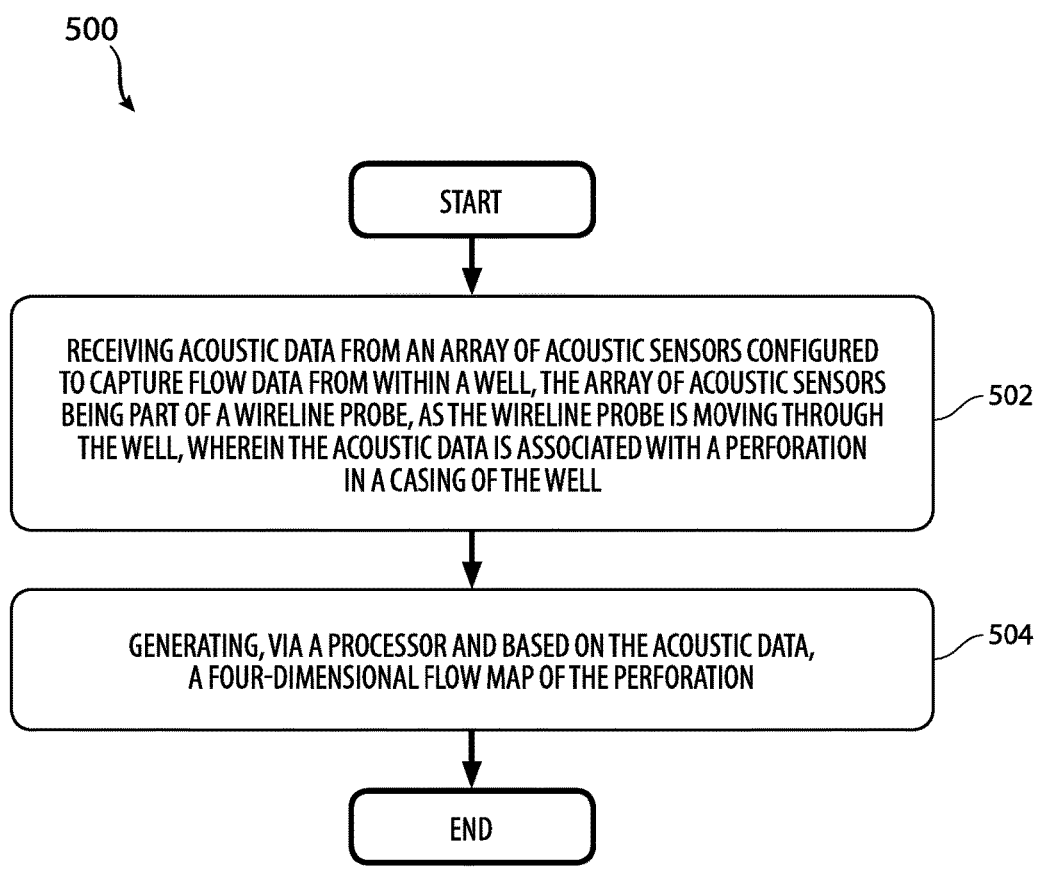
FIG. 5 illustrates an example method embodiment.

Having disclosed some basic system components and concepts, the disclosure now turns to the exemplary method embodiment shown in FIG. 5. For the sake of clarity, the method 500 is described in terms of an exemplary system 400 as shown in FIG. 4 configured to practice the method. The steps outlined herein are exemplary and can be implemented in any combination thereof, including combinations that exclude, add, or modify certain steps.

The system 400 receives acoustic data from the array of acoustic sensors as the wireline probe is moving through the well, wherein the acoustic data is associated with a perforation in a casing of the well (502). The system then generates, via a processor and based on the acoustic data, a four-dimensional flow map of the perforation (504).

The four-dimensional flow map can illustrate: (1) a shape of a tunnel into a formation adjacent to the perforation, the tunnel having been formed by a charge; (2) a flow rate of material flowing into the well from the formation; and (3) the shape and flow rates over time. Other embodiments can produce "snapshots" representing single moment, three-dimensional flow maps of the perforation, which can be stored in a database. In addition, predictive modeling and/or algorithms (such as machine learning algorithms, regression analyses, etc.) can be performed to predict expected flow over a future time period, wherein the prediction uses at least one of a three dimensional flow map, historical three-dimensional flow maps associated with the perforation, and a four-dimensional flow map formed by combining the three dimensional flow map with the historical three-dimensional flow maps. The prediction modeling and/or algorithm can modify programming instructions and/or processors to improve the accuracy and speed at which predictions of flow related to the perforation are made.

The system 400 can also compare a predicted shape of the perforation to the three-dimensional flow map, to yield a comparison, and use that comparison to generate a score for a charge used to create the perforation. The system 400 can also perform a quantitative flow profile of the perforation based on the three-dimensional flow map. In yet another configuration, the system 400 can predict, based at least in part on the three-dimensional flow map, when a condition of a formation associated with the perforation will occur, the condition being one of a sanding out and a watering out of the formation. Systems 400 can be configured to perform a flow prediction analysis and/or a phase distribution analysis of the well based, at least in part, on the three-dimensional flow map.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to vertical or horizontal wells. Various modifications and changes may be made to the principles described herein without following the example embodiments and applications illustrated and described herein, and without departing from the spirit and scope of the disclosure.

Statements of the disclosure include:

Statement 1: A system comprising: an array of acoustic sensors configured to capture flow data from within a well; a wireline probe on which the array of acoustic sensors are mounted; a processor; and a computer-readable storage medium having instructions which, when executed by the processor, cause the processor to perform operations comprising: receiving acoustic data from the array of acoustic sensors as the wireline probe is moving through the well, wherein the acoustic data is associated with a perforation in a casing of the well; and generating, based on the acoustic data, a three-dimensional flow map of the perforation.

Statement 2: The system of Statement 1, the computer-readable storage medium having additional instructions stored which, when executed by the processor, cause the processor to perform operation comprising: storing the three-dimensional flow map of the perforation in a database; and producing a four-dimensional flow map of the perforation by combining the three-dimensional flow map with historical three-dimensional flow maps associated with the perforation, wherein the four-dimensional flow map models a flow over time.

Statement 3: The system of Statement 1 or 2, the computer-readable storage medium having additional instructions stored which, when executed by the processor, cause the processor to perform operations comprising: performing at least one of a predictive algorithm and predictive modeling, to yield a prediction of expected flow over a future time period, wherein the prediction of expected flow over a future time period, wherein the prediction uses at least one of the three dimensional flow map, historical three-dimensional flow maps associated with the perforation, and a four-dimensional flow map formed by combining the three dimensional flow map with the historical three-dimensional flow maps.

Statement 4: The system of any of Statements 1-3, the computer-readable storage medium having additional instructions stored which, when executed by the processor, cause the processor to perform operations comprising: comparing a predicted shape of the perforation to the three-dimensional flow map, to yield a comparison; and generating a score for a charge used to create the perforation based on the comparison.

Statement 5: The system of any of Statements 1-4, the computer-readable storage medium having additional instructions stored which, when executed by the processor, cause the processor to perform operations comprising: performing a quantitative flow profile of the perforation based on the three-dimensional flow map.

Statement 6: The system of any of Statements 1-5, the computer-readable storage medium having additional instructions stored which, when executed by the processor, cause the processor to perform operations comprising: predicting, based at least in part on the three-dimensional flow map, when a condition of a formation associated with the perforation will occur, the condition being one of a sanding out and a watering out of the formation.

Statement 7: The system of any of Statements 1-6, wherein the three-dimensional flow map illustrates: (1) a shape of a tunnel into a formation adjacent to the perforation, the tunnel having been formed by a charge; and (2) a flow rate of material flowing into the well from the formation.

Statement 8: The system of any of Statements 1-7, the computer-readable storage medium having additional instructions stored which, when executed by the processor, cause the processor to perform operations comprising: performing a flow prediction analysis of the well based, at least in part, on the three-dimensional flow map.

Statement 9: The system of any of Statements 1-8, the computer-readable storage medium having additional instructions stored which, when executed by the processor, cause the processor to perform operations comprising: performing a phase distribution analysis of the well based, at least in part, on the three-dimensional flow map.

Statement 10: A method comprising: receiving acoustic data from an array of acoustic sensors configured to capture flow data from within a well, the array of acoustic sensors being part of a wireline probe, as the wireline probe is moving through the well, wherein the acoustic data is associated with a perforation in a casing of the well; and generating, via a processor and based on the acoustic data, a three-dimensional flow map of the perforation.

Statement 11: The method of Statement 10, further comprising: storing the three-dimensional flow map of the perforation in a database; and producing a four-dimensional flow map of the perforation by combining the three-dimensional flow map with historical three-dimensional flow maps associated with the perforation, wherein the four-dimensional flow map models a flow over time.

Statement 12: The method of Statement 10 or 11, further comprising: performing at least one of a predictive algorithm and predictive modeling, to yield a prediction of expected flow over a future time period, wherein the prediction of expected flow over a future time period, wherein the prediction uses at least one of the three dimensional flow map, historical three-dimensional flow maps associated with the perforation, and a four-dimensional flow map formed by combining the three dimensional flow map with the historical three-dimensional flow maps.

Statement 13: The method of any of Statements 10-12, further comprising: comparing a predicted shape of the perforation to the three-dimensional flow map, to yield a comparison; and generating a score for a charge used to create the perforation based on the comparison.

Statement 14: The method of any of Statements 10-13, further comprising: performing a quantitative flow profile of the perforation based on the three-dimensional flow map.

Statement 15: The method of any of Statements 10-14, further comprising: predicting, based at least in part on the three-dimensional flow map, when a condition of a formation associated with the perforation will occur, the condition being one of a sanding out and a watering out of the formation.

Statement 16: The method of any of Statements 10-15, wherein the three-dimensional flow map illustrates: (1) a shape of a tunnel into a formation adjacent to the perforation, the tunnel having been formed by a charge; and (2) a flow rate of material flowing into the well from the formation.

Statement 17: The method of any of Statements 10-16, further comprising: performing a flow prediction analysis of the well based, at least in part, on the three-dimensional flow map.

Statement 18: The method of any of Statements 10-17, further comprising: performing a phase distribution analysis of the well based, at least in part, on the three-dimensional flow map.

Statement 19: A computer-readable storage device having instructions stored which, when executed by a computing device, cause the computing device to perform operations comprising: receiving acoustic data from an array of acoustic sensors configured to capture flow data from within a well, the array of acoustic sensors being part of a wireline probe, as the wireline probe is moving through the well, wherein the acoustic data is associated with a perforation in a casing of the well; and generating, based on the acoustic data, a three-dimensional flow map of the perforation.

Statement 20: The computer-readable storage device of Statement 19, having additional instructions stored which, when executed by the computing device, cause the computing device to perform operations comprising: storing the three-dimensional flow map of the perforation in a database; and producing a four-dimensional flow map of the perforation by combining the three-dimensional flow map with historical three-dimensional flow maps associated with the perforation, wherein the four-dimensional flow map models a flow over time.

Statement 21: The method of Statement 19 or Statement 20, further comprising: performing at least one of a predictive algorithm and predictive modeling, to yield a prediction of expected flow over a future time period, wherein the prediction of expected flow over a future time period uses at least one of the three dimensional flow map, historical three-dimensional flow maps associated with the perforation, and a four-dimensional flow map formed by combining the three dimensional flow map with the historical three-dimensional flow maps.

Statement 22: The method of any of Statements 19-21, further comprising: comparing a predicted shape of the perforation to the three-dimensional flow map, to yield a comparison; and generating a score for a charge used to create the perforation based on the comparison.

Statement 23: The method of any of Statements 19-22, further comprising: performing a quantitative flow profile of the perforation based on the three-dimensional flow map.

Statement 24: The method of any of Statements 19-23, further comprising: predicting, based at least in part on the three-dimensional flow map, when a condition of a formation associated with the perforation will occur, the condition being one of a sanding out and a watering out of the formation.

Statement 25: The method of any of Statements 19-24, wherein the three-dimensional flow map illustrates: (1) a shape of a tunnel into a formation adjacent to the perforation, the tunnel having been formed by a charge; and (2) a flow rate of material flowing into the well from the formation.

Statement 26: The method of any of Statements 19-25, further comprising: performing a flow prediction analysis of the well based, at least in part, on the three-dimensional flow map.

Statement 27: The method of any of Statements 19-26, further comprising: performing a phase distribution analysis of the well based, at least in part, on the three-dimensional flow map.

We claim:

1. A system comprising:
a three-dimensional array of acoustic sensors configured to capture flow data from within a well;
a wireline probe on which the three-dimensional array of acoustic sensors are mounted;
a processor; and
a computer-readable storage medium having instructions which, when executed by the processor, cause the processor to perform operations comprising:
receiving acoustic data from the three-dimensional array of acoustic sensors as the wireline probe is moving through the well, wherein the acoustic data is associated with a charge used to generate a perforation in a casing of the well;
generating, based on the acoustic data, a three-dimensional flow map of the perforation generated by the charge using said acoustic data received from the three-dimensional array of acoustic sensors,
wherein said three-dimensional flow map illustrates a flow rate of material flowing into the well from the formation based on said acoustic data received from the three-dimensional array of acoustic sensors;
comparing a predicted shape of the perforation generated by the charge to the three-dimensional flow map based on the charge to yield a comparison; and
generating a score of the charge used to generate the perforation based on the comparison.

2. The system of claim 1, the computer-readable storage medium having additional instructions stored which, when executed by the processor, cause the processor to perform operation comprising:
storing the three-dimensional flow map of the perforation in a database; and
producing a four-dimensional flow map of the perforation by combining the three-dimensional flow map with historical three-dimensional flow maps associated with the perforation, wherein the four-dimensional flow map models a flow over time.

3. The system of claim 1, the computer-readable storage medium having additional instructions stored which, when executed by the processor, cause the processor to perform operations comprising:
performing at least one of a predictive algorithm and predictive modeling, to yield a prediction of expected flow over a future time period, wherein the prediction of expected flow uses at least one of the three-dimensional flow map, historical three-dimensional flow maps associated with the perforation, and a four-dimensional flow map formed by combining the three-dimensional flow map with the historical three-dimensional flow maps.

4. The system of claim 1, the computer-readable storage medium having additional instructions stored which, when executed by the processor, cause the processor to perform operations comprising:
generating a quantitative flow profile of the perforation based on the three-dimensional flow map.

5. The system of claim 1, the computer-readable storage medium having additional instructions stored which, when executed by the processor, cause the processor to perform operations comprising:
predicting, based at least in part on the three-dimensional flow map, when a condition of a formation associated with the perforation will occur, the condition being one of a sanding out and a watering out of the formation.

6. The system of claim 1, wherein the three-dimensional flow map illustrates:
(1) a shape of a tunnel into a formation adjacent to the perforation, the tunnel having been formed by the charge; and
(2) a flow rate of material flowing into the well from the formation.

7. The system of claim 1, the computer-readable storage medium having additional instructions stored which, when executed by the processor, cause the processor to perform operations comprising:
performing a flow prediction analysis of the well based, at least in part, on the three-dimensional flow map.

8. The system of claim 1, the computer-readable storage medium having additional instructions stored which, when executed by the processor, cause the processor to perform operations comprising:
performing a phase distribution analysis of the well based, at least in part, on the three-dimensional flow map.

9. A method comprising:
receiving acoustic data from an array of acoustic sensors configured to capture flow data from within a well, the array of acoustic sensors being part of a wireline probe, as the wireline probe is moving through the well, wherein the acoustic data is associated with a charge used to generate a perforation in a casing of the well;
generating, via a processor and based on the acoustic data, a three-dimensional flow map of the perforation generated by the charge using said acoustic data received from the three-dimensional array of acoustic sensors,
wherein said three-dimensional flow map illustrates a flow rate of material flowing into the well from the formation based on said acoustic data received from the three-dimensional array of acoustic sensors;
comparing a predicted shape of the perforation generated by the charge to the three-dimensional flow map based on the charge to yield a comparison; and
generating a score of the charge used to generate the perforation based on the comparison.

10. The method of claim 9, further comprising:
storing the three-dimensional flow map of the perforation in a database; and
producing a four-dimensional flow map of the perforation by combining the three-dimensional flow map with historical three-dimensional flow maps associated with the perforation, wherein the four-dimensional flow map models a flow over time.

11. The method of claim 9, further comprising:
performing at least one of a predictive algorithm and predictive modeling, to yield a prediction of expected flow over a future time period, wherein the prediction of expected flow uses at least one of the three-dimensional flow map, historical three-dimensional flow maps associated with the perforation, and a four-dimensional flow map formed by combining the three-dimensional flow map with the historical three-dimensional flow maps.

12. The method of claim 9, further comprising:
generating a quantitative flow profile of the perforation based on the three-dimensional flow map.

13. The method of claim 9, further comprising:
predicting, based at least in part on the three-dimensional flow map, when a condition of a formation associated with the perforation will occur, the condition being one of a sanding out and a watering out of the formation.

14. The method of claim 9, wherein the three-dimensional flow map illustrates:
(1) a shape of a tunnel into a formation adjacent to the perforation, the tunnel having been formed by the charge; and
(2) a flow rate of material flowing into the well from the formation.

15. The method of claim 9, further comprising:
performing a flow prediction analysis of the well based, at least in part, on the three-dimensional flow map.

16. The method of claim 9, further comprising:
performing a phase distribution analysis of the well based, at least in part, on the three-dimensional flow map.

17. A computer-readable storage device having instructions stored which, when executed by a computing device, cause the computing device to perform operations comprising:
receiving acoustic data from an array of acoustic sensors configured to capture flow data from within a well, the array of acoustic sensors being part of a wireline probe, as the wireline probe is moving through the well, wherein the acoustic data is associated with a charge used to generate a perforation in a casing of the well;
generating, based on the acoustic data, a three-dimensional flow map of the perforation generated by the charge using said acoustic data received from the three-dimensional array of acoustic sensors,
wherein said three-dimensional flow map illustrates a flow rate of material flowing into the well from the formation based on said acoustic data received from the three-dimensional array of acoustic sensors;
comparing a predicted shape of the perforation generated by the charge to the three-dimensional flow map based on the charge to yield a comparison; and
generating a score of the charge used to generate the perforation based on the comparison.

18. The computer-readable storage device of claim 17, having additional instructions stored which, when executed by the computing device, cause the computing device to perform operations comprising:
storing the three-dimensional flow map of the perforation in a database; and
producing a four-dimensional flow map of the perforation by combining the three-dimensional flow map with historical three-dimensional flow maps associated with the perforation, wherein the four-dimensional flow map models a flow over time.

* * * * *